(12) United States Patent
Ramsden et al.

(10) Patent No.: US 11,347,683 B2
(45) Date of Patent: May 31, 2022

(54) POLICY-BASED PERFORMANCE OF STORAGE MANAGEMENT OPERATIONS ON OBJECTS OF A FILE SYSTEM USING AN INDEX OF THE FILE SYSTEM

(71) Applicant: EMC IP Holding Company LLC, Hopkinton, MA (US)

(72) Inventors: Raymond Ramsden, Seattle, WA (US); Harsha Mahuli, Sammamish, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 211 days.

(21) Appl. No.: 16/265,977

(22) Filed: Feb. 1, 2019

(65) Prior Publication Data
US 2020/0250132 A1 Aug. 6, 2020

(51) Int. Cl.
*G06F 16/11* (2019.01)
*G06F 16/13* (2019.01)

(52) U.S. Cl.
CPC .......... *G06F 16/122* (2019.01); *G06F 16/128* (2019.01); *G06F 16/13* (2019.01)

(58) Field of Classification Search
CPC ....... G06F 16/122; G06F 16/128; G06F 16/13
See application file for complete search history.

(56) References Cited

U.S. PATENT DOCUMENTS

| | | | | |
|---|---|---|---|---|
| 7,237,061 B1* | 6/2007 | Boic | ...................... | G06F 12/084 711/113 |
| 8,352,431 B1* | 1/2013 | Protopopov | .......... | G06F 16/128 707/640 |
| 8,751,515 B1* | 6/2014 | Xing | ...................... | G06F 16/113 707/755 |
| 2003/0182317 A1* | 9/2003 | Kahn | .................... | G06F 16/174 |

\* cited by examiner

*Primary Examiner* — Irete F Ehichioya
*Assistant Examiner* — Xiaoqin Hu
(74) *Attorney, Agent, or Firm* — Amin, Turocy & Watson, LLP

(57) ABSTRACT

Policy-based performance of storage management operations on objects of a file system using an index of the file system is presented herein. An object policy component maintains an object policy specifying that an operation is to be performed on an object of objects that have been stored in a system in response to a determination that a state of the object satisfies a defined policy condition. Further, a job component periodically accesses an index data structure of the system comprising respective attributes of the objects that have been stored in the system, and in response to the state of the object being determined, based on a group of attributes of the respective attributes of the object, to satisfy the defined policy condition, performs the operation on the object.

20 Claims, 10 Drawing Sheets

POLICY-BASED PERFORMANCE OF STORAGE MANAGEMENT OPERATIONS ON OBJECTS OF A FILE SYSTEM USING AN INDEX OF THE FILE SYSTEM

TECHNICAL FIELD

The subject disclosure generally relates to embodiments for policy-based performance of storage management operations on objects of a file system using an index of the file system.

BACKGROUND

Conventional storage technologies enforce customer-based storage policies by "crawling" through each file of a file system—using input/output (I/O) operations to inspect data that has been stored in a file for determining whether to perform storage functions on the file according to such policies. In this regard, I/O operations are time consuming and hardware intensive. Consequently, conventional storage technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
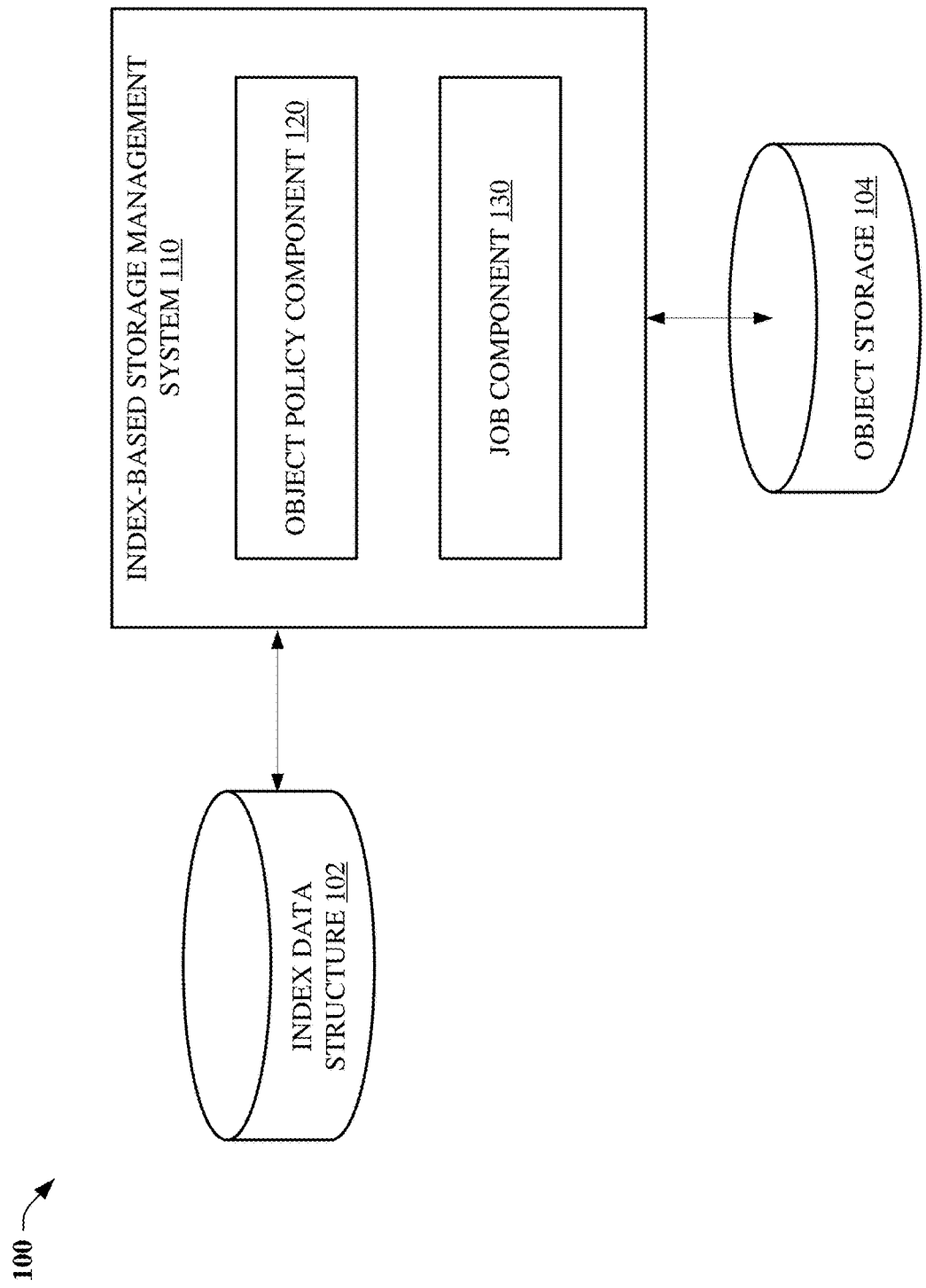
FIG. 1 illustrates a block diagram of a system that facilitates policy-based performance of storage management operations on objects of the system using an index data structure of the system, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional storage technologies have had some drawbacks with respect to crawling, via I/O operations, through every file of a file system when determining whether to perform storage operations on such files. On the other hand, various embodiments disclosed herein can reduce storage system processing overhead and use of valuable storage device bandwidth by performing storage management operations on objects of a file system using an index of the file system.

For example, a system, e.g., an index-based storage management system, a host server, a client server, etc. can comprise a processor; and a memory that stores executable components that, when executed by the processor, facilitate performance of operations by the system, the executable components comprising: an object policy component that maintains an object policy specifying that an operation is to be performed on an object of objects that have been stored in the system in response to a determination that a state of the object satisfies a defined policy condition; and a job component that periodically, repeatedly, etc. accesses an index data structure of the system comprising respective attributes of the objects that have been stored in the system, and in response to the state of the object being determined, based on a group of attributes of the respective attributes of the object, to satisfy the defined policy condition, performs the operation on the object.

In an embodiment, the object comprises a file, a snapshot identification (ID) corresponding to the file representing a point-in-time copy of the file, a directory, or other metadata of the system.

In one embodiment, the index data structure comprises a distinct identifier of the object comprising an opaque, non-repeating immutable identifier of the file, which can be used to access the file. In this regard, the distinct identifier of the file can comprise a logical mode number (LIN) that references block addresses of data blocks of the file and/or a snapshot ID corresponding to a version of the LIN.

In another embodiment, the group of attributes of the object comprises, e.g., metadata, representing a canonical filename of the file, a type of the file, an access time of the file, a birth time of the file, a change time of the file, a modification time of the file, a file extension of the file, a type of content of the file, a logical size of the file, and/or a parameter specifying that the group of attributes of the file has been determined not to conform to the object policy, e.g., directing the job component that the group of attributes of the object have been determined to be incorrect.

In yet another embodiment, the group of attributes of the object comprises, e.g., metadata, representing a data access pattern of the file, a protection policy of the file representing a protection level of the file, a storage pool policy of the file, a write optimization strategy of the file, data stream information representing an alternate data stream corresponding to the file, and/or a packing strategy of the file with respect to storage of the file.

In an embodiment, the data access pattern represents how the file has been accessed, read, and/or written over the period. In other embodiment(s), the data access pattern represents how the file should be accessed/read.

In one embodiment, the object is a file, and in response to the policy being determined, by the job component, to match, based on a first attribute of the group of attributes that have been stored in the index data structure (e.g., based on an access/birth/change/modification time of the file), the file, and in response to the state of the object being determined, by the job component, not to satisfy the policy condition (e.g., a storage tier assigned by the object policy doesn't match a second attribute of the group of attributes representing a storage tier that the file has been stored on) opens, via a system procedure, I/O operation, etc. of the system, the file to access file attributes of the file; and in response to the group of attributes being determined to match the file attributes, performs the operation on the file, e.g., to enforce the object policy on the file.

In another embodiment, a first attribute of the group of attributes represents that the file comprises a defined type, and a second attribute of the group of attributes comprises a customer defined parameter representing that the defined type should be stored in a first storage tier (e.g., having a first performance that is lower than a second performance of a second storage tier), or representing that the file has not been accessed within a defined period. Further, the first attribute and the second attribute represent the state of the object, and the operation comprises storing the file in the first storage tier and/or moving the file from the second storage tier to the first storage tier.

In yet another embodiment, the job component: generates job worker processes within respective data storage nodes of the system; and assigns respective distinct portions of the index data structure to the job worker processes. In this regard, the job worker processes independently determine, using the respective distinct portions of the index data structure, object attributes of respective objects of the objects that have been stored in the system, and in response to respective determinations, based on the object attributes, that states of the respective objects comprising the state satisfy the defined policy condition, perform the operation on the respective objects.

In an embodiment, the object policy component comprises: a user interface component that receives, via a command-line interface of the system and/or a graphical user interface (GUI) of the system, policy information representing the object policy and comprising operation information representing the operation, object information representing the object, and condition information representing the defined policy condition. Further, the object policy component comprises a policy modification component that modifies, based on the policy information, the object policy.

In one embodiment, a method can comprise: obtaining, by a system comprising a processor, policy information specifying that an operation be performed on a data object of data objects of the system and be performed in response to a group of attributes of the data object being determined to satisfy a defined policy condition representing a defined state of the data object; storing, by the system, attributes of the data objects in an index data structure of the system, wherein the attributes comprise the group of attributes of the data object; and in response to determining, using the index data structure, that the group of attributes satisfy the defined policy condition, performing, by the system, the operation on the data object.

In another embodiment, the data object is a file, and the performing the operation comprises: in response to opening, via a system call of the system, the file, determining file attributes that have been stored in the file; and in response to determining that the file attributes match the group of attributes, performing the operation on the file.

In yet another embodiment, the object policy comprises an automated up-tiering/down-tiering file policy, in which the data objects are files comprising the file, the group of attributes comprises a first attribute representing a file type of the file and a second attribute representing a customer defined parameter indicating that the defined type should be stored in a first storage tier having a first performance that is lower/higher than a second performance of a second storage tier, or representing, e.g., via an access time representing when the file was last accessed, that the file has not been accessed within a defined period. Further, the first attribute and the second attribute represent the state of the object, and the operation comprises storing the file in the first storage tier and/or moving the file from the second storage tier to the first storage tier.

In an embodiment, the determining comprises: generating processing jobs, e.g., job worker processes, in respective data storage nodes of the system; independently obtaining, via the processing jobs using different portions of the index data structure representing respective data objects of the data objects of the system, object attributes of the attributes corresponding to the respective data objects; and in response to the independently obtaining the object attributes, enforcing, via the processing jobs, the defined policy condition on the respective data objects, e.g., by independently determining, via the processing jobs, whether the object attributes satisfy the defined policy condition.

In one embodiment, the obtaining the policy information comprises: receiving, by the system via a user interface of the system, the policy information; storing, by the system, the policy information in a data storage device of the system; and retrieving, by the system, the policy information from the data storage device.

Another embodiment can comprise a machine-readable storage medium comprising instructions that, in response to execution, cause a file system comprising a processor to perform operations, comprising: obtaining a defined object policy representing an operation to be performed on an object of objects of the file system based on a defined property of the object; repeatedly determining, using an index data structure of the file system comprising respective attributes of the objects, one or more attributes of the respective attributes of the object representing a state of the object; and in response to the state of the object being determined, based on the one or more attributes of the object, to satisfy the defined object policy with respect to the defined property of the object, performing the operation on the object.

In yet another embodiment, the object is a file, and the performing the operation on the object comprises opening the file; in response to the opening the file, determining a group of file attributes of the file that have been stored in the file; and in response to the group of file attributes being determined to match the one or more attributes, performing the operation on the file.

In an embodiment, the operations further comprise: receiving, via a user interface of the file system, information representing the defined object policy; and storing the information in a data storage device of the file system. In another embodiment, the obtaining comprises obtaining the information representing the defined object policy from the data storage device.

As described above, conventional storage technologies have had some drawbacks with respect to crawling through each file of a file system when determining whether to perform storage functions on the file. In contrast, and now referring to FIGS. 1 and 2, various embodiments described herein can improve use of system resources by utilizing an index data structure that stores attributes of objects of the system to enforce customer storage policies. In this regard, an index-based storage management system (110) can comprise an object storage system, e.g., file system, comprising, but not limited to comprising, a parallel distributed networked file system, e.g., OneFS™ file system provided by Dell EMC® Isilon Systems, e.g., utilizing a FreeBSD based operating system. In embodiment(s), the index-based storage management system can comprise a host server, a client server, etc. In other embodiment(s), various components of the index-based storage management system can be included in a host application, a client application, storage services (e.g., 408, 418, 428, 438, 930, 932 (see below)), etc.

Figure 9:
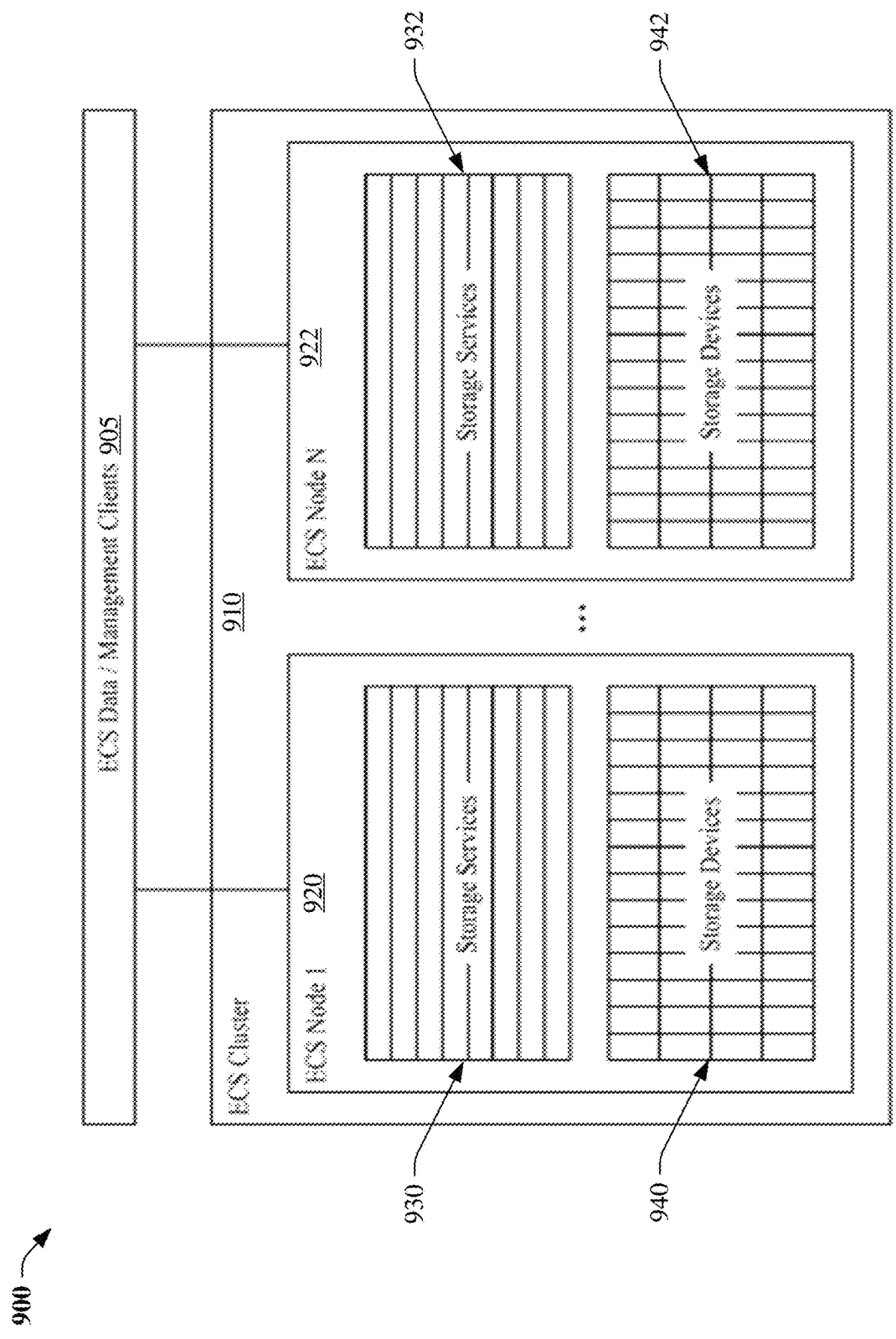
FIG. 9 illustrates a block diagram of an elastic cloud storage (ECS) system, in accordance with various example embodiments.

Referring now to FIG. 9, a Dell EMC® Isilon file storage system (900) can comprise a cloud-based object storage appliance (e.g., comprising storage control software, components (e.g., 110), etc.; elastic cloud storage (ECS) data clients/management clients (905); storage services (930, 932) and storage devices (940, 942) (e.g., comprising storage media, physical magnetic disk media, solid-state drive (SSD) media, e.g., flash storage, etc.) of a storage cluster (910). In this regard, the cloud-based object storage appliance is a type of clustered file system that spreads data across multiple storage nodes, e.g., usually for redundancy or performance. Further, such clustered file system can simultaneously be mounted on multiple file servers (not shown), e.g., OneFS™ clusters, and can provide features like location-independent addressing and redundancy which can improve reliability and/or reduce the complexity of portion(s) of a data cluster, data storage cluster, etc.

As illustrated by FIG. 9, the storage service(s) and storage device(s) can be included in respective data storage nodes of data storage clusters, e.g., combined as an integrated system—with no access to the storage devices other than through the Dell EMC® Isilon file storage system. In this regard, the respective data storage nodes can be communicatively and/or operatively coupled to each other, with the storage service(s) comprising respective processes, processing jobs, job worker processes, applications, etc. that can be utilized to service user requests according to user-based storage policies.

In general, the respective data storage nodes can communicate with user devices via wired and/or wireless communication network(s) to provide access to services that are based in the cloud and not stored locally (e.g., on a user device). A typical cloud-computing environment can include multiple layers, aggregated together, which interact with each other to provide resources for end-users.

The Dell EMC® Isilon file storage system can support storage, manipulation, and/or analysis of unstructured data on a massive scale on commodity hardware. As an example, the Dell EMC® Isilon file storage system can support mobile, cloud, big data, and/or social networking applications. In another example, the Dell EMC® Isilon file storage system can be deployed as a turnkey storage appliance, or as a software product that can be installed on a set of qualified commodity servers and disks, e.g., within a node, data storage node, ECS node, etc. of a cluster, data storage cluster, ECS cluster, etc. In this regard, the Dell EMC® Isilon file storage system can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the Dell EMC® Isilon file storage system can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed and/or closed—becoming immutable, e.g., read-only and delete only.

It should be appreciated that in various embodiments disclosed herein with respect to moving, copying, etc. data from source storage (e.g., of object storage described below) to destination storage (e.g., of object storage described below), such data is assumed to be immutable during such operations. Further, it should be appreciated that the source storage and the destination storage can comprise physical storage device(s), virtual storage device(s), hard disk drive(s), cloud based storage device(s), etc.

Referring again to FIG. 1, the index-based storage management component comprises an object policy component (120) and a job component (130). The object policy component can maintain an object policy specifying that an operation is to be performed on an object of objects that have been stored in object storage (104), in response to a determination that a state of the object satisfies a defined policy condition. In turn, the job component can periodically, repeatedly, etc. (e.g., based on a defined schedule) read, access, etc. an index data structure (102) comprising respective attributes of the objects, and in response to the state of the object being determined, by the job component based on a group of attributes (of the respective attributes) of the object, to satisfy the defined policy condition, perform the operation on the object.

In an embodiment, the object can comprise a file, a snapshot ID corresponding to the file representing a point-in-time copy of the file, a directory, or other metadata of the system. In other embodiment(s), the object storage comprises a low performance storage medium, e.g., comprising a hard-disk drive (HDD) comprising a spinning disk media, e.g., having a slow read access time, low cost, etc. In yet another embodiment(s), the object storage comprises a high performance storage medium, e.g., SSD storage, e.g., comprising a flash memory device, e.g., having a fast read access time that is at least an order of magnitude, e.g., ten times, lower than the slow read access time; having a high cost that is higher than the low cost of the low performance media, etc.

In this regard, a customer of the index-based storage management system can specify, define, etc. (see, e.g., description related to FIG. 5 below) the object policy, e.g., with respect to performing the operation on objects, files, etc. of the file system (e.g., with respect to storing the objects, files, etc. on particular storage devices, tiers, etc. of the object storage) based on respective states of the objects, files, etc. being determined to match defined attribute(s) of the objects, files, etc.

Figure 2:
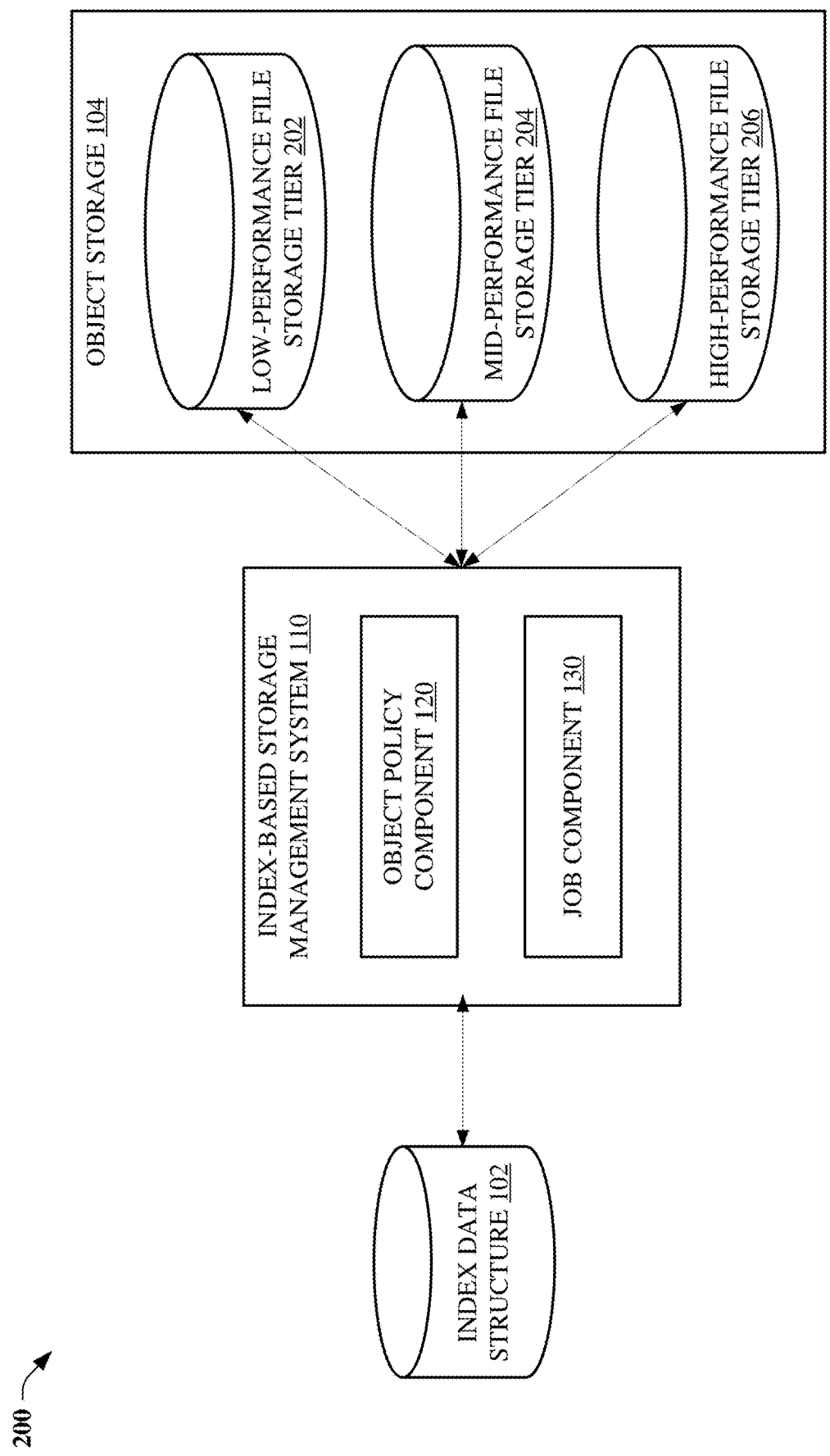
FIG. 2 illustrates a block diagram of a system that facilitates policy-based tiering of files of the system using an index data structure of the system, in accordance with various example embodiments.

For example, and now referring to FIG. 2, a customer who renders, stores, etc. files comprising movies, data streams, etc. onto data storage clusters (not shown) of the object storage can purchase access of respective data storage clusters of the data storage clusters based on a performance level, or tier, of the respective data storage clusters, e.g., the customer can be charged first fees to store, access, etc. movies via a low performance data storage cluster (e.g., of a low-performance file storage tier (202)) comprising the low performance storage medium, and second fees to store, access, etc. movies via a high performance data storage cluster (e.g., of a high-performance file storage tier (206)) comprising the high performance storage medium—the first fees being lower than the second fees. In embodiment(s) illustrated by FIG. 2, the customer can select other tiers (e.g., a mid-performance file storage tier (204)) of the respective data storage clusters from which to store, access, etc. movies, e.g., based on a third fee that is greater than the first fee and less than the second fee, e.g., a defined performance of the mid-performance file storage tier being greater than the low performance data storage cluster and less than the high performance data storage cluster.

Further, the customer can define an object policy, e.g., an automated "down-tiering" policy, that specifies that objects, e.g., files of a defined attribute (e.g., representing that the file is of a defined type, defined content, etc. (e.g., a movie, an email, a picture, a sound file, etc.)) should be initially rendered, e.g., stored, onto high performance data storage clusters, but objects that have been determined to satisfy the defined policy condition (e.g., being determined not to have been read, accessed, etc. for a defined period, e.g., greater than 1 month) should be stored/moved from the high performance data storage cluster(s) on/to the low performance data storage clusters.

In other embodiment(s), the customer can define an attribute of the group of attributes representing a customer defined parameter indicating that the defined type should be stored in a storage tier of a defined performance.

In yet other embodiment(s), the customer can define the object policy to perform a defined operation on an object in response to a state of the object being determined to be represented by a combination of customer selected attribute(s) of a group of attributes of the index data structure, e.g., corresponding to respective object identifiers of objects that are stored in the object storage.

Figure 3:
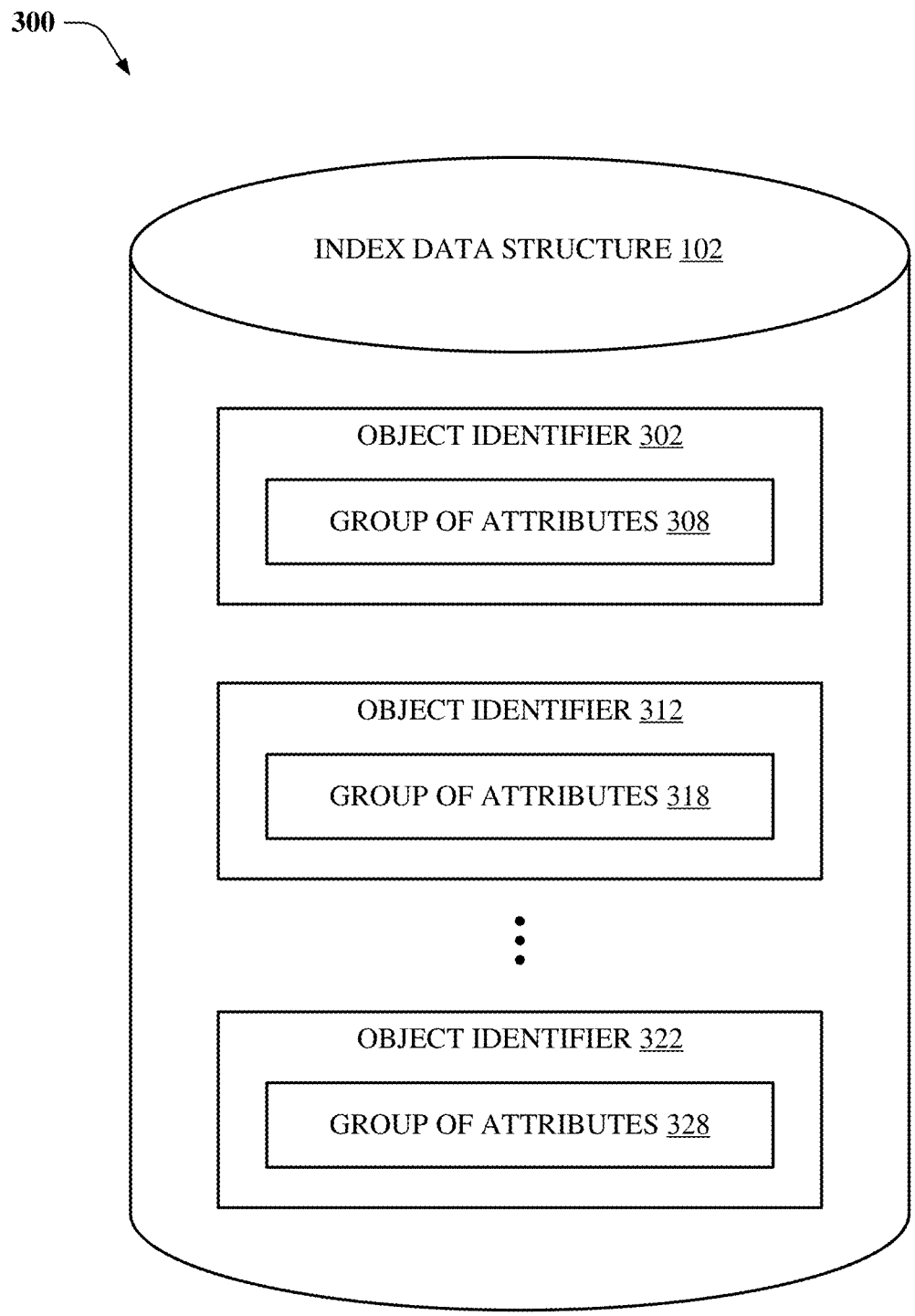
FIG. 3 illustrates a block diagram of an index data structure, in accordance with various example embodiments.

In this regard, and now referring now to FIG. 3, the index data structure comprises object identifiers (302, 312, 322) of the objects that are stored in the object storage. In embodiment(s), an object identifier comprises a distinct identifier of a file, e.g., an opaque, non-repeating immutable identifier of the file that can be used to access the file. In this regard, the distinct identifier of the file can comprise a LIN that references block addresses of data blocks of the file and/or a snapshot ID corresponding to a version of the LIN. In turn, the index data structure comprises a group of attributes (308, 318, 328) corresponding to respective object identifiers of the objects. In this regard, unlike conventional storage technologies that utilize I/O operations to obtain file properties, the object policy component can periodically, repeatedly, etc., e.g., based on a defined schedule, determine respective attributes for each of the objects that have been stored in the object storage by referencing the index data structure.

In embodiment(s), the group of attributes of an object, e.g., a file, comprises a canonical filename of the file, a type of the file, an access time of the file, a birth time of the file, a change time of the file, a modification time of the file, a file extension of the file, a type of content of the file, a logical size of the file (e.g., representing a number of bytes that the object storage system will reproduce upon a read/write operation that is performed on the file), and/or a parameter specifying that the group of attributes of the file has been determined not to conform to the object policy, e.g., directing the job component that the group of attributes of the object have been determined to be incorrect.

In other embodiment(s), the group of attributes of the object comprises a data access pattern of the file, a protection policy of the file representing a protection level of the file, a storage pool policy of the file, a write optimization strategy of the file, data stream information representing an alternate data stream corresponding to the file, and/or a packing strategy of the file with respect to storage of the file.

In yet other embodiment(s), the group of attributes of the object can comprise a compression attribute of the file (e.g., representing whether the file should be compressed or not compressed, defining a type of compression to be performed on the file, etc.), and/or a deduplication attribute of the file specifying deduplication preferences for the file.

In embodiment(s), the data access pattern can represent how the file should be accessed and/or read. For example, the data access pattern of the file can represent that the file is normally accessible via a streaming, e.g., bandwidth intensive, application. In this regard, in an embodiment, in response to the data access pattern being determined, by the job component, to satisfy a defined policy condition representing that files accessible via streaming applications should be stored in a cache, volatile memory buffer, etc. (all not shown), the job component can enforce the defined policy condition by storing portions of the files in the cache, pre-fetching portions of the file from the object storage into the cache, etc.

In an embodiment, the protection level of the file can represent a protection level of a storage node, e.g., comprising multiple storage devices, disks, solid-state disk drives, etc. In turn, the job component can enforce the defined policy condition on the storage node.

In another example, the protection level of the file can represent that the file should be/should not be protected from disk loss, etc., e.g., that the file corresponds to/does not correspond to important financial, business, personal, etc. information.

In this regard, in an embodiment, in response to the protection level being determined, by the job component, to satisfy a defined policy condition specifying that files of the protection level should be protected from disk loss, etc., the job component can facilitate duplication of the file in portion(s) of the object storage.

In yet another example, in response to the protection level being determined, by the job component, to satisfy a defined policy condition specifying that files (e.g., log files, short-lived files, etc.) of the protection level should not be protected from disk loss, etc., e.g., that system resources should not be used to provide duplicate protection of the file, the job component can remove extra data from the file, file system, etc. corresponding duplication of the file, etc. in response to such data being determined to have been created with respect to duplication of the file.

In an example, the storage pool policy of the file can specify that the file should be stored in a defined tier of storage, and the job component can facilitate enforcing such policy by moving, storing, etc. the file to the defined tier of storage in response to determining that the file has not been stored in the defined tier of storage.

In one example, the write optimization strategy can specify that the file should be stored in a lower performance storage, e.g., comprising a spinning magnetic drive, or a higher performance storage, e.g., comprising an SSD. In another example, the write optimization strategy can comprise a coalescer strategy specifying that writes of a defined small amount of data blocks should initially be written to the cache, and later written to a HDD. In turn, the job component can facilitate enforcement of respective policies corresponding to such strategies, e.g., by moving a file to storage defined by the write optimization strategy, by initially storing the writes of the defined small amount of data blocks to the cache, etc.

In another example, the data stream information can represent an alternate data stream corresponding to the file, e.g., a graphical element, icon, etc. —the data stream information representing, e.g., properties of the alternate data steam, e.g., a size of the alternate data stream, and/or other metadata described above with respect to representing the object, e.g., a storage pool policy of the alternate data stream, a protection policy of the alternate data stream, etc.

In another example, the packing strategy of the file with respect to storage of the file can represent, in embodiment(s), a protection strategy and/or a packing strategy of the file, e.g., with respect to optimization of smaller files, e.g., being determined to be less than or equal to a defined small file size (e.g., less than 1 kilobytes). In this regard, since a system overhead of protecting/packing the smaller files can be high, and in response to the packing strategy representing that a protection/packing strategy for smaller files should be selected, then the job component can group, pack, etc. smaller files together into a combined file, and store, protect, etc. the combined file.

It should be appreciated that in embodiment(s), an index processing component (not shown) of the file system can independently, e.g., with respect to operations being performed via components (e.g., 120, 130) of the file system described herein, update the respective attributes of the index data structure for each of the objects that have been stored in the object storage, e.g., via system procedures that have been initiated based on respective operations that have been detected, e.g., via system procedures, calls, etc. to have been performed on the objects.

In this regard, the respective attributes of the objects that have been stored in the index data structure may not match with current attributes of the objects, e.g., due to processing lag, delay, etc. between the index processing component and various components (e.g., 120, 130) described herein. To account for such lag, delay, etc., the job component, in response to the state of the object being determined to satisfy the defined policy condition, can verify that current attribute(s) of the object match with corresponding attributes of the object that have been stored in the index data structure.

For example, in embodiment(s), in response to the policy being determined, by the job component, to match, based on a first attribute of the group of attributes that have been stored in the index data structure (e.g., based on an access/birth/change/modification time of the file), the file, and in response to the state of the object being determined, by the job component, not to satisfy the policy condition (e.g., a storage tier assigned by the object policy doesn't match a second attribute of the group of attributes representing a storage tier that the file has been stored on), opens, via a system procedure, I/O operation, etc. of the system, the object, file, etc. to access object attributes, current attributes, etc. of the object, file, etc. that have been stored, e.g., as metadata, within the object, file, etc. Further, in response to the group of attributes being determined to match the object attributes obtained via the object, file, etc., the job component can enforce the policy on the object, file, etc., e.g., perform the operation, e.g., raise/lower a protection policy/scheme of the object, file, etc.; move the object, file, etc. to a defined tier of storage; modify a packing of the file, etc. Furthermore, the job component can record, update, etc. attribute(s) of the object, file, etc. that have been stored in the index data structure, e.g., to account for, reflect, etc. the operation that has been performed on the object, file, etc. by the job component.

It should be appreciated that in embodiment(s), the performance of the operation can result in not performing an actual operation on the object, file, etc., e.g., in response to a determination, by the job component, that attribute(s) of the object, file, etc. satisfy the object policy, e.g., if the defined policy condition represents that the object, file, etc. should be stored in a high performance tier, and in response to object, file, etc. being determined, by the job component, to be stored in such tier, the job component will not perform an operation, e.g., move the file to the high performance tier because it has already been stored on such tier.

Figure 4:
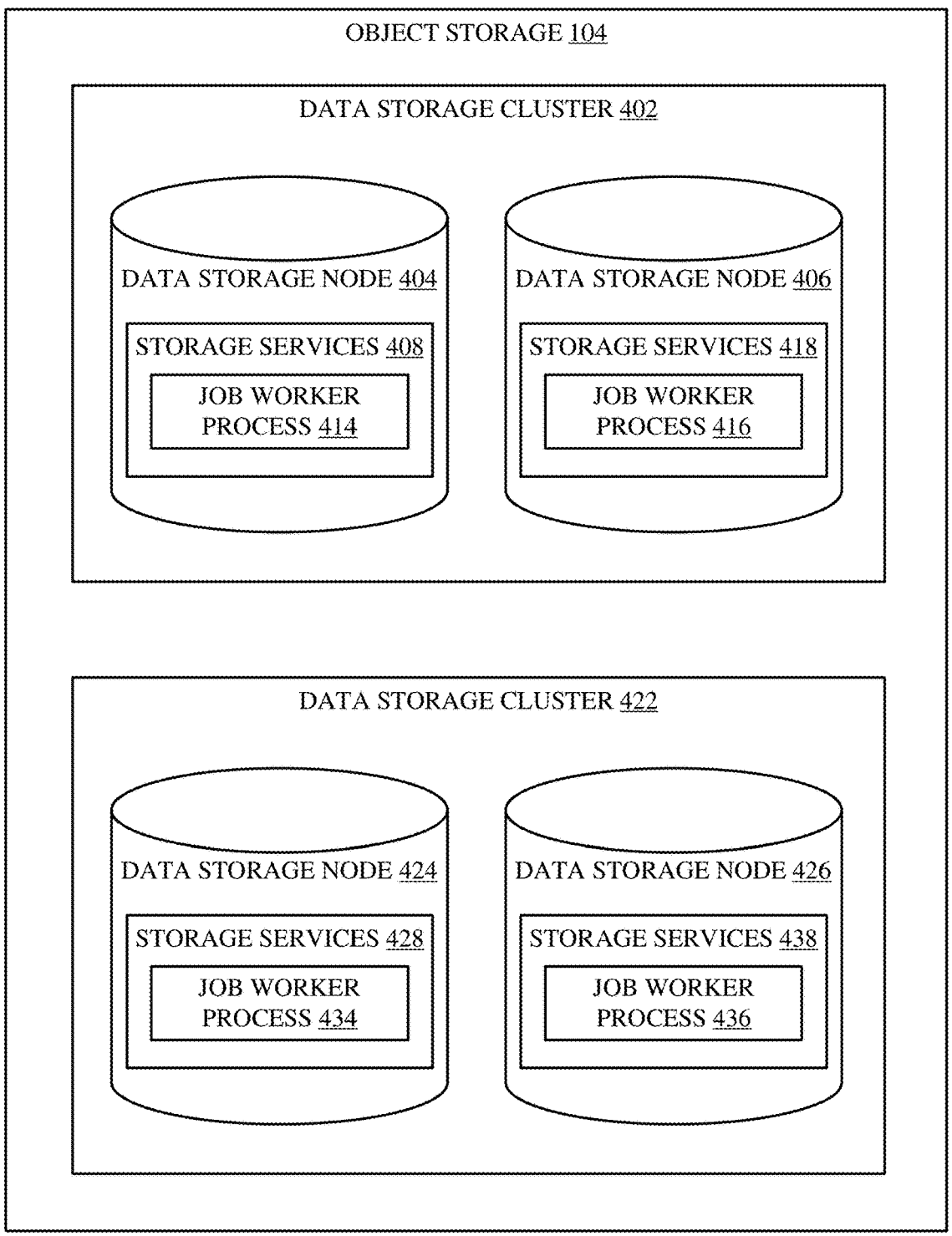
FIG. 4 illustrates a block diagram of object storage comprising distributed data storage clusters comprising respective job worker processes, in accordance with various example embodiments.

Referring now to FIG. 4, in embodiment(s), the job component can generate job worker processes (414, 416, 434, 436), e.g., of respective storage services (408, 418, 428, 438), within respective data storage nodes (404, 406, 424, 426) of respective data storage clusters (402, 422) of the system. In turn, the job component can assign respective distinct portions of the index data structure to the job worker processes. In this regard, the job worker processes can independently (e.g., via respective processing threads executing on the respective storage services, e.g., simultaneously) determine, using the respective distinct portions of the index data structure, object attributes of respective objects that have been stored in the object storage, and in response to states of the respective objects being determined, via the job worker processes based on the object attributes, to satisfy the defined policy condition, the job worker process can independently perform the operation on the respective objects.

Figure 5:
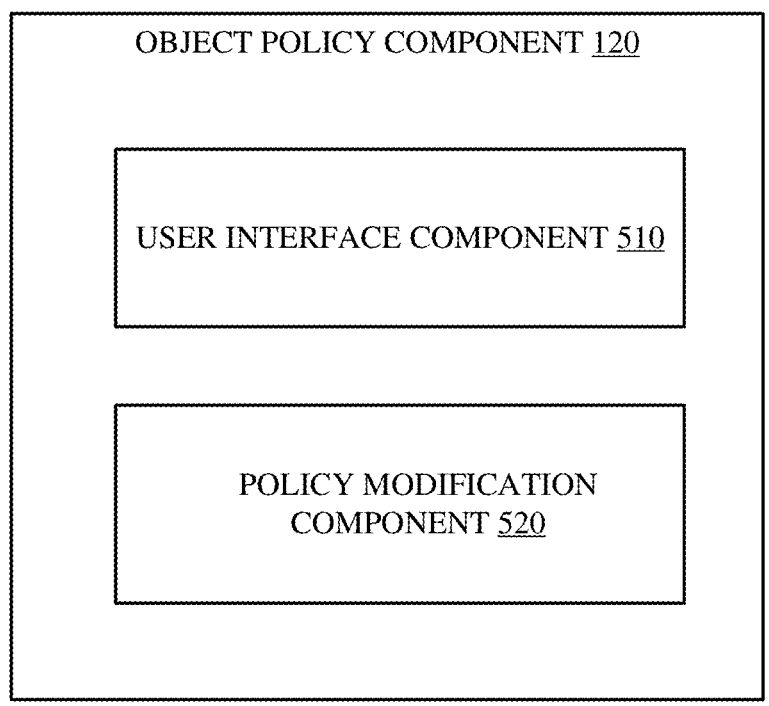
FIG. 5 illustrates a block diagram of an object policy component of a system that facilitates policy-based performance of storage management operations on objects of the system using an index data structure of the system, in accordance with various example embodiments.

FIG. 5 illustrates embodiment(s) in which the object policy component comprises a user interface component (510) and a policy modification component (520). In this regard, the user interface component can receive, via a command-line interface of the system and/or a GUI of the system, policy information representing the object policy and comprising operation information representing the operation, object information representing the object, and condition information representing the defined policy condition. Further, the policy modification component can modify the object policy based on the policy information.

Figure 6:
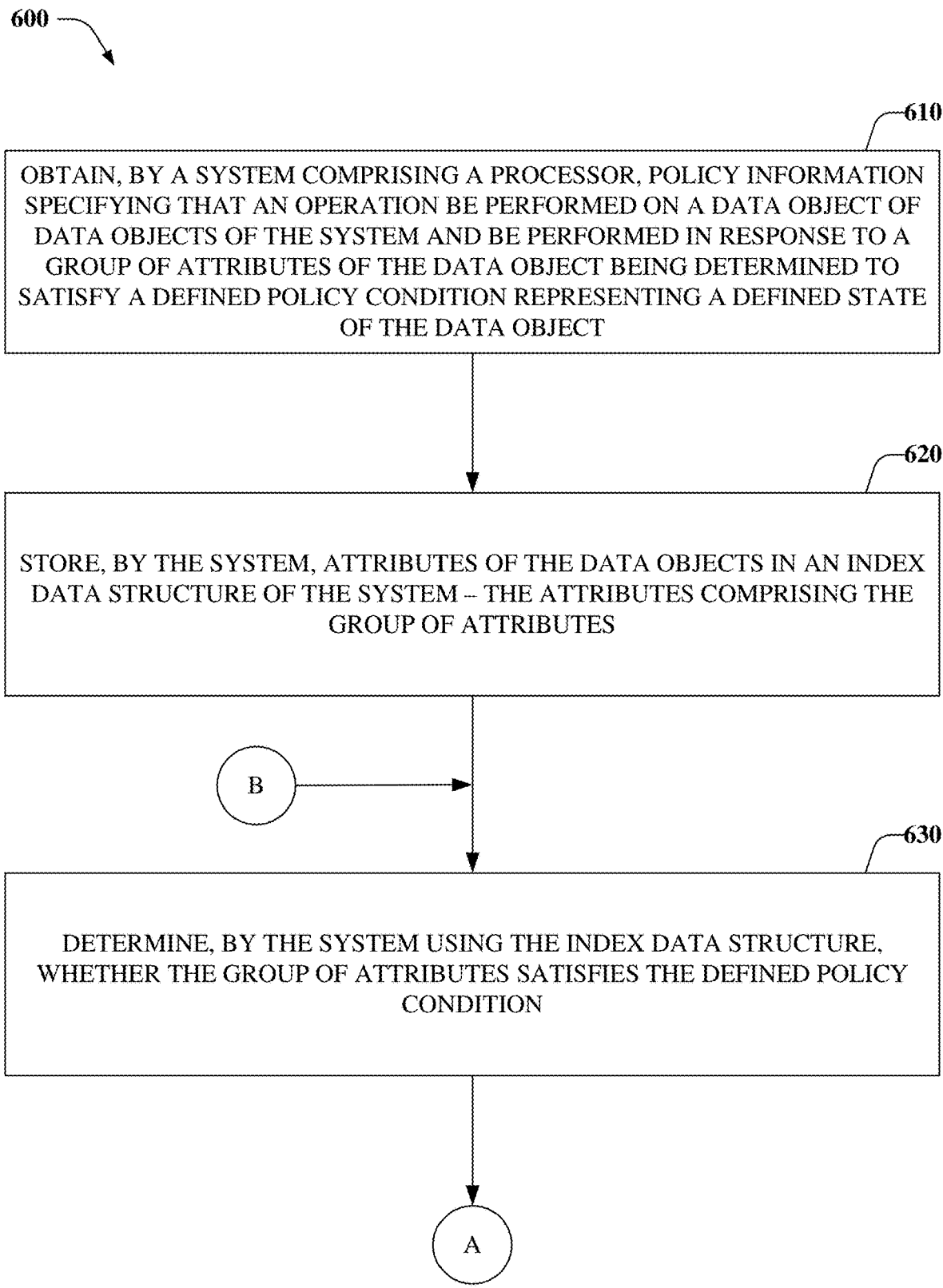
FIGS. 6-7 illustrate flow charts of a method associated with policy-based performance of storage management operations on objects of a system using an index data structure of the system, in accordance with various example embodiments.
Figure 7:
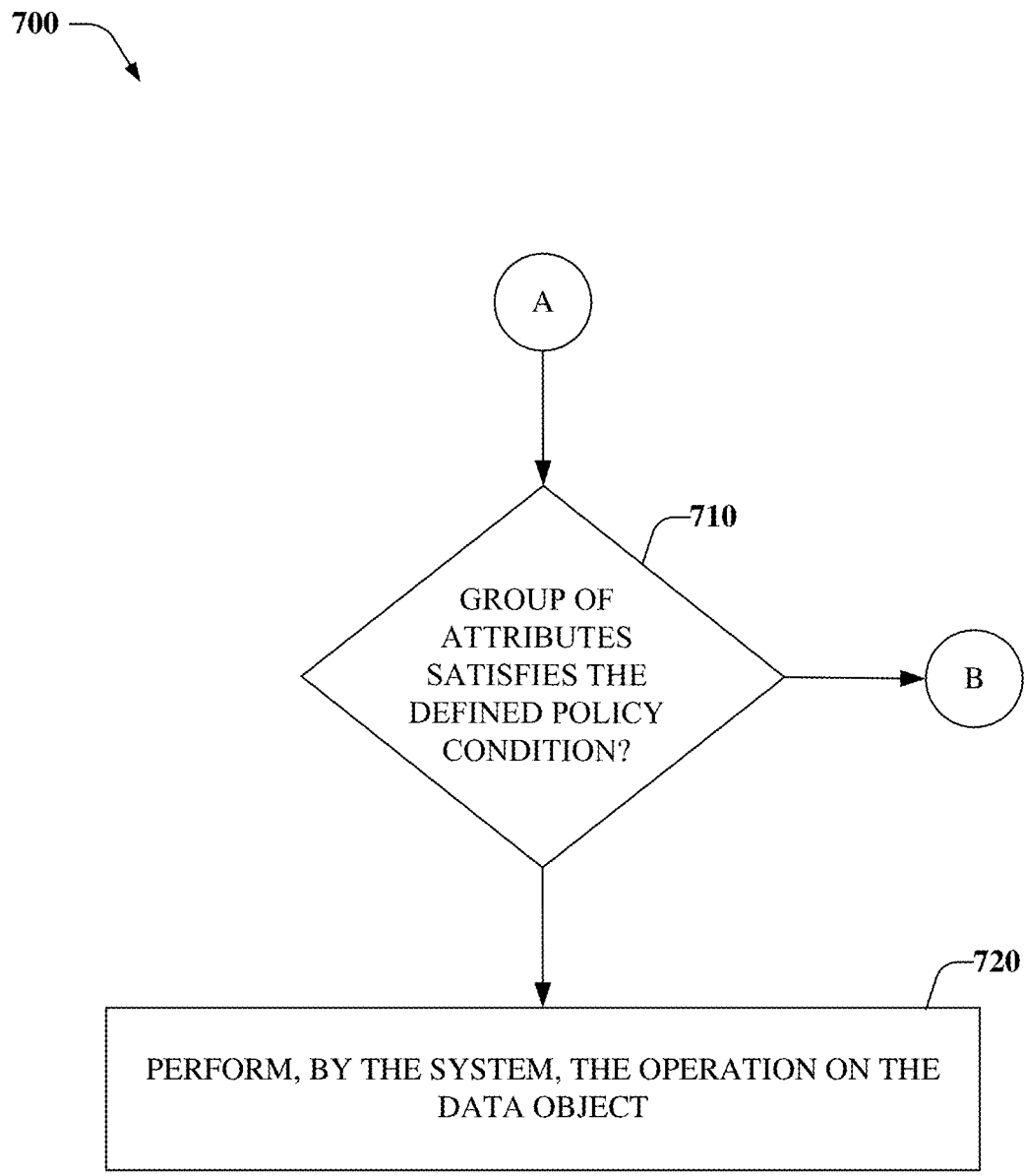
Figure 8:
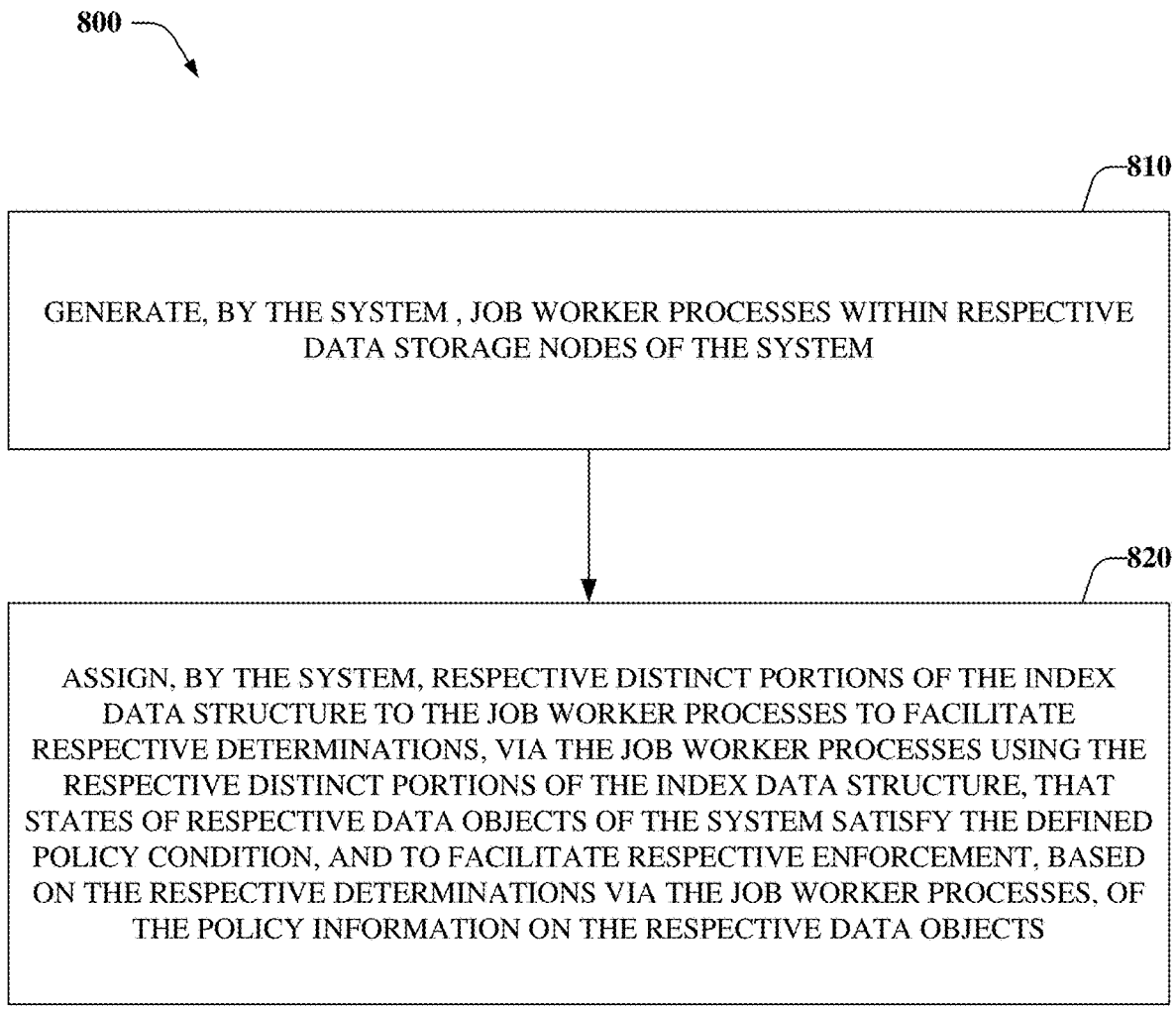
FIG. 8 illustrates a flow chart of a method associated with distributed job worker processes, in accordance with various example embodiments.

FIGS. 6-8 illustrate methodologies for performing operations corresponding to policy-based performance of storage management operations on objects of a system (e.g., 110) using an index data structure of the system, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIGS. 6-7, a method associated with policy-based performance of storage management operations on objects of a system using an index data structure of the system is illustrated, in accordance with various example embodiments. At 610, a system comprising a processor (e.g., 110) can obtain policy information specifying that an operation be performed on a data object of data objects of the system and be performed in response to a group of attributes of the data object being determined to satisfy a defined policy condition representing a defined state of the data object. At 620, the system can store attributes (comprising the group of attributes) of the data objects in an index data structure of the system. At 630, the system can determine, using the index data structure, whether the group of attributes satisfies the defined policy condition.

At 710, in response to the group of attributes being determined to satisfy the defined policy condition, flow continues to 720, at which the system can perform the operation on the data object, e.g., enforcing a corresponding object policy on the data object; otherwise flow returns to 630.

FIG. 8 illustrates a flow chart of a method associated with distributed job worker processes, in accordance with various example embodiments. At 810, a system (e.g., 110) can generate job worker processes, processing threads, etc. within respective data storage nodes of the system. At 820, the system can assign respective distinct portions of the index data structure to the job worker processes to facilitate respective determinations, via the job worker processes using the respective distinct portions of the index data structure, that states of respective data objects of the system satisfy the defined policy condition, and to facilitate respective enforcement, based on the respective determinations via the job worker processes, of the policy information on the respective data objects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic", "logical", "logically", and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component", "system", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via the object policy component (120), the job component (130), etc. to obtain a defined object policy representing an operation to be performed on an object of objects of such system based on a defined property of the object; periodically determine, using an index data structure of such system comprising respective attributes of the objects, one or more attributes of the respective attributes of the object representing a state of the object; and in response to the state of the object being determined, based on the one or more attributes of the object, to satisfy the defined object policy with respect to the defined property of the object, perform the operation on the object, e.g., enforce the defined object policy on the object.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by the index-based storage management system (110).

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantumdot based transistors, switches and gates, in order to optimize space usage or enhance performance of mobile devices. A processor may also be implemented as a combination of computing processing units.

In the subject specification, terms such as "object storage", "storage tier", "data cluster storage", "data storage node", "storage devices", "data store," "data storage," "source storage", "destination storage", "storage device", "storage medium", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in object storage (104), non-volatile memory 1022 (see below), disk storage 1024 (see below), and/or memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory 1020 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
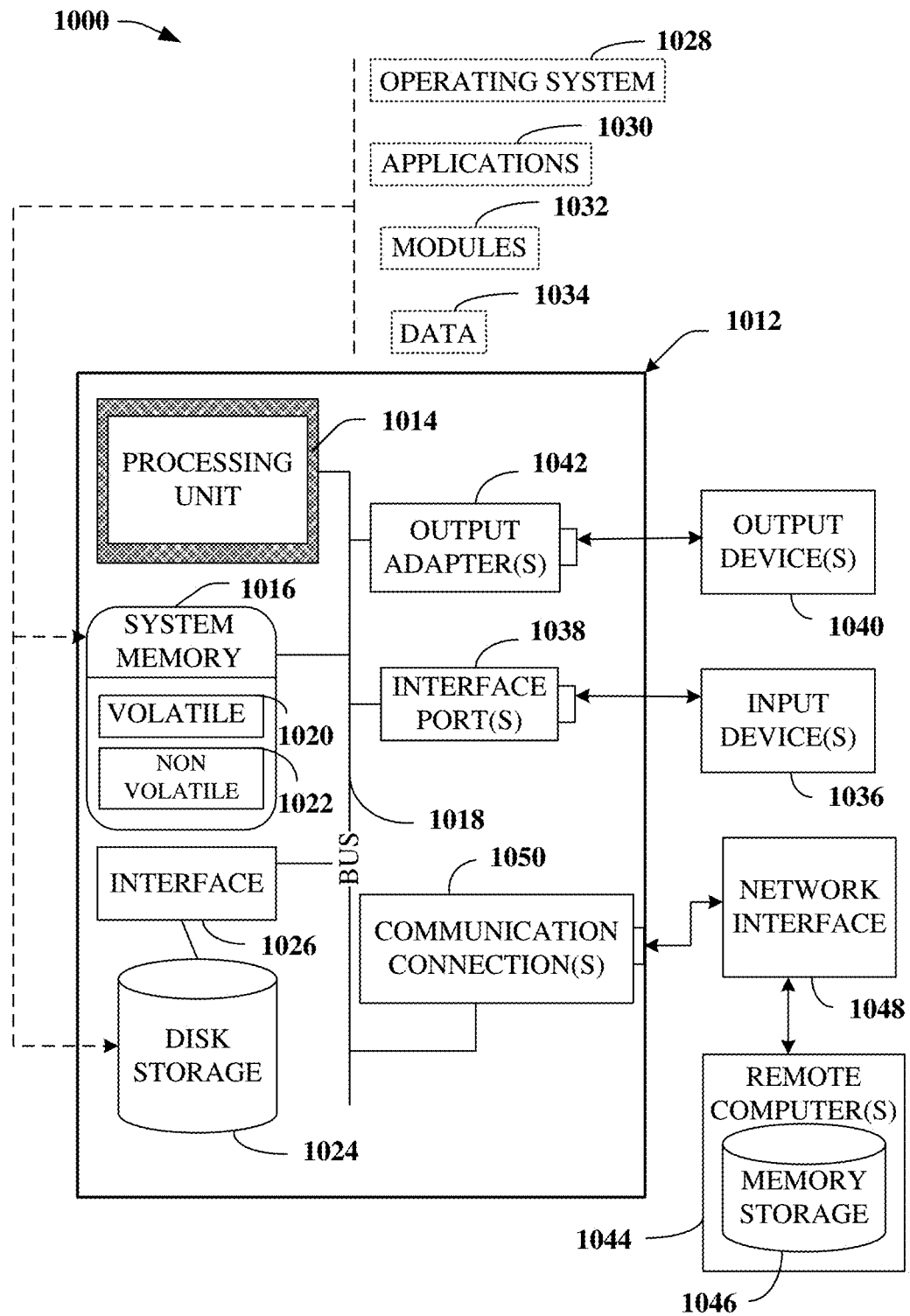
FIG. 10 illustrates a block diagram representing an illustrative non-limiting computing system or operating environment in which one or more aspects of various embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing system 1000, e.g., index-based storage management system 110, operable to execute the disclosed systems and methods is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable components that, when executed by the processor, facilitate performance of operations by the system, the executable components comprising:
an object policy component that maintains an object policy specifying that an operation is to be performed on an object of objects that have been stored in object storage of the system in response to a determination that a state of the object satisfies a defined policy condition, wherein the object comprises a file, and wherein the state of the object comprises a file state of the file; and a job component that
  generates job worker processes within respective data storage nodes of the system, and further,
  accesses, based on a defined schedule via a job worker process of the job worker processes, an index data structure of the system comprising respective object identifiers of the objects and respective attributes of the objects, wherein an object identifier of the respective object identifiers comprises a distinct identifier of the file comprising a logical inode number that references block addresses of data blocks of the file and a snapshot identification corresponding to a version of the logical inode number, and further,
  in response to the state of the object being determined, based on a group of attributes of the respective attributes that have been stored in the index data structure and that correspond to the object, to satisfy the defined policy condition, performs the operation on the object, wherein the group of attributes comprises a data access pattern attribute of the object representing whether the object is accessible via a streaming application, and further,
  in response to the data access pattern attribute being determined to represent that the file is accessible via the streaming application, prefetches, based on the logical inode number that references the block addresses of the data blocks of the file and the snapshot identification corresponding to the version of the logical inode number, the data blocks of the file from the object storage and stores the data blocks in a cache memory of the system, and further,
  in response to the file state being determined, via the index data structure, not to satisfy a policy condition of the object policy, opens the file to account for respective processing delays between a first attribute of the file that has been stored as file metadata within the file being updated by a system procedure of the system and the group of attributes being updated via the job worker process, and further,
  in response to the first attribute being determined to match a second attribute of the group of attributes that has been stored in the index data structure, performing the operation on the file.

2. The system of claim 1, wherein the object comprises the snapshot identification corresponding to the file representing a point-in-time copy of the file, a directory, or other metadata of the system.

3. The system of claim 2, wherein the index data structure further comprises a distinct identifier of the object comprising a non-repeating immutable identifier of the file.

4. The system of claim 2, wherein the group of attributes of the object comprises metadata representing at least one of a canonical filename of the file, a type of the file, an access time of the file, a birth time of the file, a modification time of the file, a file extension of the file, a type of content of the file, a logical size of the file, or a parameter representing that the file has been determined not to conform to the object policy.

5. The system of claim 2, wherein the group of attributes of the object comprises metadata representing at least one of a storage pool policy of the file, a write optimization strategy of the file, data stream information representing an alternate data stream corresponding to the file, or a packing strategy of the file with respect to storage of the file.

6. The system of claim 5, wherein the data access pattern attribute further represents how the file has been accessed over a period, read over the period, or written over the period.

7. The system of claim 1, wherein the system procedure is a first system procedure, and wherein the job component opens the file via a second system procedure.

8. The system of claim 7, wherein a first group attribute of the group of attributes represents that the file comprises a defined type, wherein a second group attribute of the group of attributes comprises a customer defined parameter representing that the defined type is to be stored in a first storage tier having a first performance that is lower than a second performance of a second storage tier or representing that the file has not been accessed within a defined period, and wherein the operation comprises at least one of storing the file in the first storage tier or moving the file from the second storage tier to the first storage tier.

9. The system of claim 1, wherein the job component:
  assigns respective distinct portions of the index data structure to the job worker processes, wherein the job worker processes independently
  determine, using the respective distinct portions of the index data structure, the respective attributes, and
  in response to respective determinations, based on the respective attributes, that states of respective objects of the objects satisfy the defined policy condition, perform the operation on the respective objects.

10. The system of claim 1, wherein the object policy component comprises:
  a user interface component that receives, via at least one of a command-line interface of the system or a graphical user interface of the system, policy information representing the object policy, wherein the policy information comprises operation information representing the operation, object information representing the object, and condition information representing the defined policy condition; and
  a policy modification component that modifies, based on the policy information, the object policy.

11. A method, comprising:
  obtaining, by a system comprising a processor, policy information specifying that an operation be performed on a data object of data objects of the system and be performed in response to a group of attributes of the data object being determined to satisfy a defined policy condition representing a defined state of the data object, wherein the data object comprises a file, and wherein the defined state of the data object comprises a defined file state of the file;
  storing, by the system, attributes of the data objects in an index data structure of the system, wherein the attributes comprise the group of attributes of the data object, and wherein the group of attributes of the data object comprises a distinct identifier of the file comprising a logical inode number that references block addresses of data blocks of the data object and a snapshot identification representing a version of the logical inode number;
  in response to determining, based on a defined schedule using the index data structure, that the group of attributes satisfy the defined policy condition, performing, by the system, the operation on the data object, wherein the group of attributes further comprises a data access pattern attribute of the data object representing whether the data object is accessible via a streaming application, and wherein the performing of the operation comprises prefetching, based on the logical inode number and the snapshot identification, the data object, and storing the data object in a cache memory of the system in response to determining, based on the data access pattern attribute, that the data object is accessible via the streaming application; and in response to determining, via the index data structure, that the defined file state of the file does not satisfy the defined policy condition, opening, by the system, the file to account for respective processing delays between a first attribute of the file that has been stored as file metadata within the file being updated by a system call of the system and the group of attributes being updated via a process of the system, and further, in response to the first attribute being determined to match a second attribute of the group of attributes corresponding to the file that has been stored in the index data structure, performing, by the system, the operation on the file.

12. The method of claim 11, wherein the performing the operation comprises:

determining file attributes that have been stored in the file; and in response to determining that the file attributes match the group of attributes, performing the operation on the file.

13. The method of claim 12, wherein the data objects are files comprising the file, wherein the group of attributes comprises a file type attribute representing a file type of the file and a parameter attribute comprising a defined parameter representing that the file type is to be stored in a first storage tier having a first performance that is lower than a second performance of a second storage tier or representing that the file has not been accessed within a defined period, and wherein the performing the operation comprises:

at least one of storing the file in the first storage tier or moving the file from the second storage tier to the first storage tier.

14. The method of claim 11, wherein the determining comprises:

generating processing jobs in respective data storage nodes of the system;

independently obtaining, via the processing jobs using different portions of the index data structure representing respective data objects of the data objects of the system, object attributes of the attributes corresponding to the respective data objects; and in response to the independently obtaining the object attributes, enforcing, via the processing jobs, the defined policy condition on the respective data objects.

15. The method of claim 14, wherein the enforcing comprises:

independently determining, via the processing jobs, whether the object attributes satisfy the defined policy condition.

16. The method of claim 11, wherein the obtaining comprises:

receiving, by the system via a user interface of the system, the policy information;

storing, by the system, the policy information in a data storage device of the system; and retrieving, by the system, the policy information from the data storage device.

17. A non-transitory machine-readable medium comprising instructions that, in response to execution, cause a file system comprising a processor to perform operations, comprising:

obtaining a defined object policy representing an operation to be performed on an object of objects of the file system based on a defined property of the object, wherein the object comprises a file;

repeatedly determining, using an index data structure of the file system comprising respective attributes of the objects, a state of the object, wherein the state of the object comprises a file state of the file;

in response to the state of the object being determined to satisfy the defined object policy with respect to the defined property of the object, performing the operation on the object, wherein the respective attributes comprise a data access pattern of the object representing whether the object is accessible via a data streaming application, a logical inode number referencing block addresses of data blocks of the file, and a snapshot identification representing a version of the logical inode number;

in response to the data access pattern of the object being determined to represent that the file is accessible via the data streaming application, prefetching the data blocks of the file based on the logical inode number and the snapshot identification, and storing the data blocks in a cache memory of the file system; and in response to determining that the file state of the file does not satisfy the defined object policy, opening the file to account for respective processing delays between a first attribute of the file that has been stored as file metadata within the file being updated by a system call of the file system and the respective attributes being updated via a process of the file system, and further, in response to the first attribute being determined to match a second attribute of the respective attributes that has been stored in the index data structure, performing the operation on the file.

18. The non-transitory machine-readable medium of claim 17, wherein the performing the operation on the object comprises:

determining a group of file attributes of the file that have been stored in the file; and in response to the group of file attributes being determined to match the respective attributes, performing the operation on the file.

19. The non-transitory machine-readable medium of claim 17, wherein the operations further comprise:

receiving, via a user interface of the file system, information representing the defined object policy; and storing the information in a data storage device of the file system.

20. The non-transitory machine-readable medium of claim 19, wherein the obtaining comprises:

obtaining the information representing the defined object policy from the data storage device.

* * * * *